United States Patent [19]

Knapp et al.

[11] Patent Number: 4,481,699

[45] Date of Patent: Nov. 13, 1984

[54] METHOD FOR PRODUCING AN ELECTROMAGNETICALLY ACTUATABLE FUEL INJECTION VALVE

[75] Inventors: Heinrich Knapp, Leonberg; Rudolf Sauer, Benningen; Waldemar Hans, Bamberg; Mathias Linssen, Schesslitz; Jürgen Peczkowski, Bamberg; Rudolf Krauss, Stuttgart, all of Fed. Rep. of Germany

[73] Assignee: Robert Bosch GmbH, Stuttgart, Fed. Rep. of Germany

[21] Appl. No.: 413,649

[22] Filed: Sep. 1, 1982

Related U.S. Application Data

[62] Division of Ser. No. 167,623, Jul. 11, 1980, Pat. No. 4,365,747.

[30] Foreign Application Priority Data

Sep. 8, 1979 [DE] Fed. Rep. of Germany ....... 2936425

[51] Int. Cl.³ ...................... B21D 53/00; B21K 29/00; B23P 15/26

[52] U.S. Cl. .......................... 29/157.1 R; 29/213 R; 29/464; 29/525; 239/600; 251/129

[58] Field of Search ............. 29/157.1 R, 213 R, 464, 29/525; 251/359, 129; 239/1, 585, 600

[56] References Cited

U.S. PATENT DOCUMENTS

| | | | |
|---|---|---|---|
| 3,785,029 | 1/1974 | McClellan et al. | 29/157.1 R |
| 3,795,383 | 3/1974 | Lombard et al. | 29/157.1 R X |
| 3,800,600 | 4/1974 | Chapin | 29/525 |
| 3,949,456 | 4/1976 | Oberthur | 29/157.1 R |
| 4,030,668 | 6/1978 | Kiwior | 29/157.1 R X |
| 4,084,304 | 4/1978 | Myers | 29/157.1 R |
| 4,106,170 | 8/1978 | Schoeneweis | 29/157.1 R |

*Primary Examiner*—Charlie T. Moon
*Assistant Examiner*—Ronald S. Wallace
*Attorney, Agent, or Firm*—Edwin E. Greigg

[57] ABSTRACT

A fuel injection valve and a method for the automatic establishment of the desired armature stroke of the fuel injection valve are proposed which serves the purpose of injection at low fuel pressures into the intake tube of a mixture-compressing internal combustion engine with externally-supplied ignition. The fuel injection valve includes a magnetic coil surrounding a core and a flat armature guided by at least one guide diaphragm held on its outer circumference, which is firmly connected with a movable valve element cooperating with a fixed valve seat. The fuel delivered via a fuel inlet nozzle can proceed through apertures and recesses in the guide diaphragms past the valve seat to a fuel discharge nozzle by way of which a portion of the delivered fuel can flow back again into a fuel return line. Via an annular channel the fuel stream exiting from the nozzle bore cab be prepared with air which surrounds the fuel stream.

1 Claim, 16 Drawing Figures

METHOD FOR PRODUCING AN ELECTROMAGNETICALLY ACTUATABLE FUEL INJECTION VALVE

This is a division of application Ser. No. 167,623 filed July 11, 1980, now U.S. Pat. No. 4,365,747.

BACKGROUND OF THE INVENTION

The invention is related to an electromagnetically actuatable fuel injection valve of the type used for internal combustion engines. A fuel injection valve, and a method for producing the fuel injection valve, are already known, but this valve is not suitable for use in low-pressure fuel injection systems, because, as a result of heating, when it is used in a motor vehicle there is an undesirable formation of vapor bubbles and insufficient preparation of the fuel to be injected. In this valve, the armature stroke is adjusted by the interposition of spacer discs of various thicknesses. This operating procedure, first, makes it difficult to automate manufacture; also, it is expensive and causes excessively large deviations in the quantities of fuel ejected at the various fuel injection valves.

OBJECT AND SUMMARY OF THE INVENTION

The fuel injection valve according to the invention set forth herein advantage over the prior art that it can be used even in fuel injection systems having low fuel pressures, because constant cooling of the fuel injection valve and flushing away of any vapor bubbles which may form are assured by the fuel flowing through it, and the valve is easy to manufacture.

Advantageous modifications of and improvements to the fuel injection valve disclosed therein are possible by application of the characteristics disclosed herein. It is advantageous to make the guide diaphragm out of nonmagnetic material and to connect it with the side of the flat armature remote from the valve seat, as a result of which it acts simultaneously as an element for preventing magnetic adhesion.

It is especially advantageous to supply air for preparation to the metered fuel transversely to the fuel stream via an annular channel; the air for preparation is delivered via an annular channel which is formed between the valve housing and a jacket housing surrounding it, and thus thermal insulation is simultaneously provided.

The methods according to the invention for producing a fuel injection valve as disclosed herein have the advantage that the stroke adjustment of the fuel injection valve can be automated and can thus be effected very cost-favorably and precisely.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
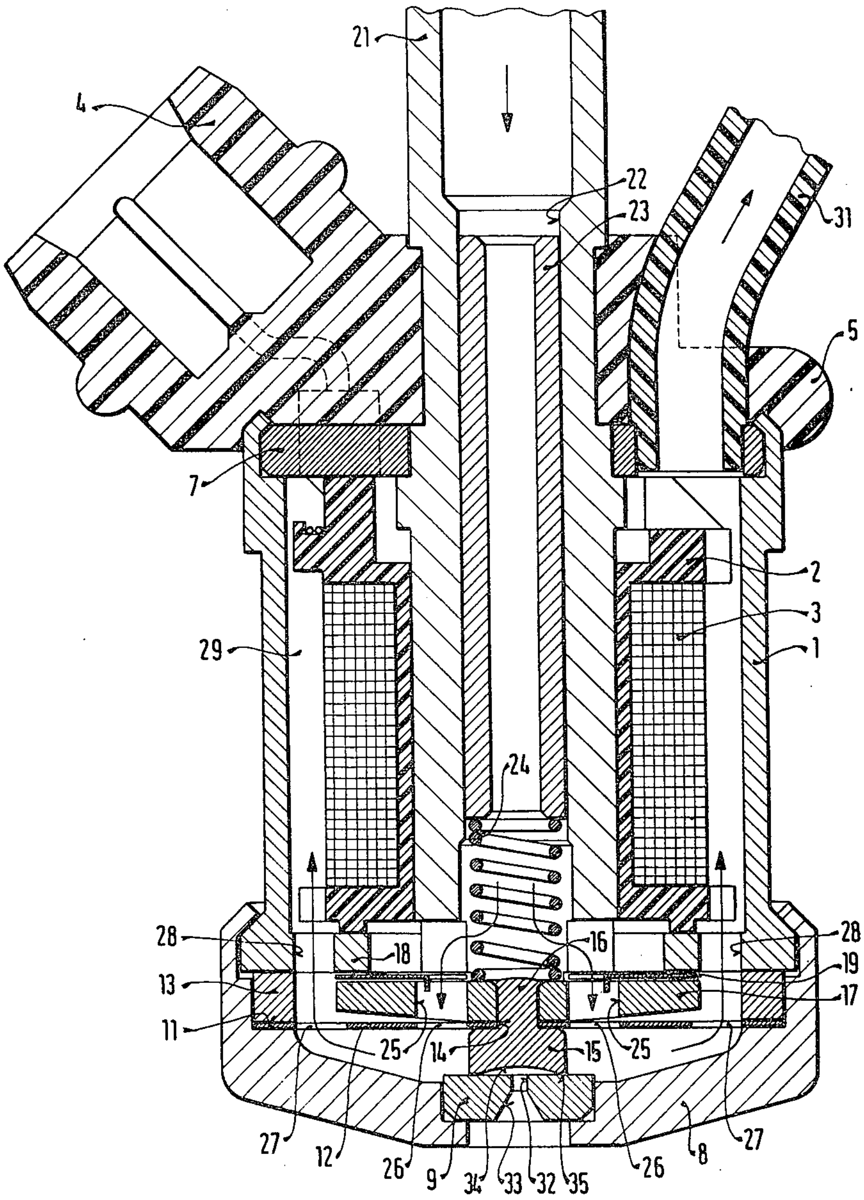
FIG. 1 shows a cross-sectional view of a first exemplary embodiment of a fuel injection valve.

The fuel injection valves shown in the drawing and intended for a fuel injection system serve the purpose of injection of fuel, especially at low pressure, into the intake tube of mixture-compressing internal combustion engines with externally-supplied ignition. In the fuel injection valve shown in FIG. 1, a magnetic coil 3 is disposed on a coil carrier 2 inside a valve housing 1. The magnetic coil is supplied with electric current via an electric plug connection 4, which is embedded in a plastic ring 5 placed axially onto the valve housing 1. A cover plate 7 is inlaid into the end of the valve housing 1 oriented toward the electric plug connection 4, and the cover plate 7 seals off the valve housing 1 at this end by means of its being flanged as shown and soldered or welded. On the end of the fuel injection valve remote from the electric plug connection 4, a nozzle carrier 8 is flanged with the valve housing 1 in a sealing manner, and a nozzle body 9 is disposed in this nozzle carrier 8.

A guide diaphragm 12 rests on a ledge or shelf area 11 in the interior of the nozzle carrier 8 and is held on the other side via a stroke ring 13, which is supported on the valve housing 1, as a result of the pressure force resulting from the flanging of the nozzle carrier 8 on the valve housing 1. A movable valve element, embodied as a valve plate 14 and having a protrusion 16, is inserted through a central bore 14 of the guide diaphragm 12 and is also riveted to a flat armature 17 which it passes through and engages. The guide diaphragm 12 guides the flat armature 17 and the valve plate 15 parallel to the nozzle body 9 acting as a fixed valve seat. A remnant air disc 19 made of nonmagnetic material is disposed between the bottom 18 of the valve housing 1 remote from the electric plug connection 4 and the flat armature 17 and prevents magnetic adhesion of the flat armature 17 to the bottom 18. The delivery of fuel, such as gasoline, is made via a central fuel inlet nozzle 21, which simultaneously acts as the core and on which the coil carrier 2 is disposed. A tube insert 23 is inserted into the inlet bore 22 of the fuel inlet nozzle 21, and a closing spring 24 is supported on one end on this tube insert 23 and on the other end rests on the flat armature 17. In the nonexcited state of the magnetic element 3, 18, the closing spring 24 presses the valve plate 15 against the nozzle body 9 acting as a valve seat, thus closing the valve. The fuel flowing via the fuel inlet nozzle 21 into the fuel injection valve proceeds through apertures 25 in the flat armature 17 and recesses 26 in the guide diaphragm 12 to the actual valve, made up of the valve seat 9 and the valve plate 12. From there, the fuel can flow by way of further recesses 27 in the outer area of the guide diaphragm 12 and past the outer circumference of the flat armature 17 via openings 28 in the bottom 18 of the valve housing 1 into a flushing chamber 29 formed between the magnetic coil 3 and the valve housing 1. The flushing chamber 29 communicates via a fuel discharge nozzle 31 with a fuel return line, not shown. In the excited state, the flat armature 17 is attracted by the magnetic coil 3 and the valve plate 15 opens a flow-through cross section opposite the nozzle body 9, through which fuel can flow into a nozzle bore 32 provided in the nozzle body 9 which throttles and meters the fuel and can then be ejected via an ejection port 33 adjoining the nozzle bore 32 and having a conically widening shape. The valve plate 15 is provided with a concave recess 34 the shape of which is as favorable to the fuel flow as possible, so that an annular surface 35 is created on the outer circumference of the valve plate 15 which cooperates with the nozzle body 9. The fuel injection valve embodied in accordance with the invention and as shown in FIG. 1 has the advantage that fuel coming via the fuel inlet nozzle 21 from a fuel supply line (not shown) can constantly be carried past the valve plate 15 and the valve seat 9 and, flowing around the magnetic coil 3, can flow back via the fuel discharge nozzle 31 into a fuel return line. Thus, first, any vapor bubbles which may form because of heating are carried along with the fuel to the fuel return line, and second, constant cooling of the fuel injection valve by the flowing fuel is assured. The friction-free guidance of the flat armature 17 and the valve plate 15 results in very good dynamic behavior of the valve and high precision in fuel metering.

Figure 2:
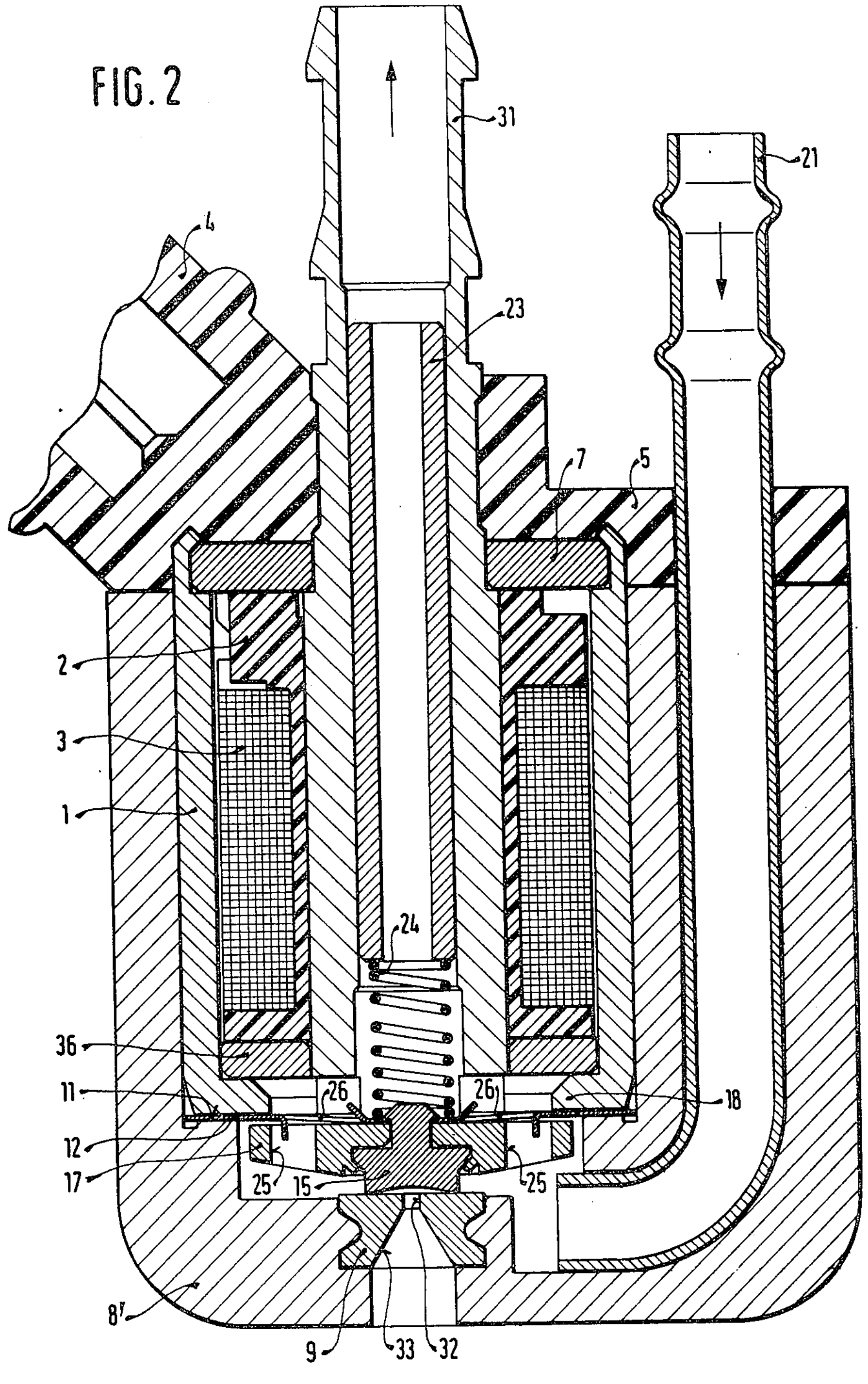
FIG. 2 shows a cross-sectional view of a second exemplary embodiment of a fuel injection valve.

In the fuel injection valve shown in FIG. 2, the elements remaining the same as and having the same function as in the fuel injection valve shown in FIG. 1 are given identical reference numerals. A difference from the fuel valve shown in FIG. 1 is a further cover plate 36 in the fuel injection valve of FIG. 2. The cover plate 36 rests on the bottom flange 18 of the valve housing 1 and is connected in a sealing manner, by soldering, for instance, with the valve housing and the outer circumference of the fuel discharge nozzle 31, which in this exemplary embodiment is centrally disposed. In this embodiment of the fuel injection valve, the magnetic coil 3 is not surrounded by a flow of fuel. The nozzle carrier 8' is embodied, for instance by an aluminum extrusion molded element, such that the valve housing 1 with the magnetic element can be pressed into it; the guide diaphragm 12 is thereby held in the outer area between the bottom flange 18 of the valve housing 1 and the ledge 11 of the nozzle carrier 8'. The guide diaphragm 12 is disposed on the side of the flat armature 17 remote from the valve seat and is connected with the flat armature in the central area. The guide diaphragm 12 is intended in this exemplary embodiment to act simultaneously as the remnant air disc for the purpose of preventing magnetic adhesion. The fuel delivered to the fuel injection valve via the eccentrically disposed fuel inlet nozzle 21, insulated from the standpoint of heat as much as possible, for instance via tubes made of plastic or at least coated with plastic on the inside, should be carried to a point as close as possible to the valve 9, 15, in order then either to be metered via the nozzle bore 32 and injected or to flow via the apertures 25 in the flat armature 17 and recesses 26 in the guide diaphragm 12 to the fuel discharge nozzle 31 and to the fuel return line. The fuel inlet nozzle 21 and fuel discharge nozzle 31 can be directed outward, parallel to one another, at one end of the fuel injection valve, as shown.

Figure 3:
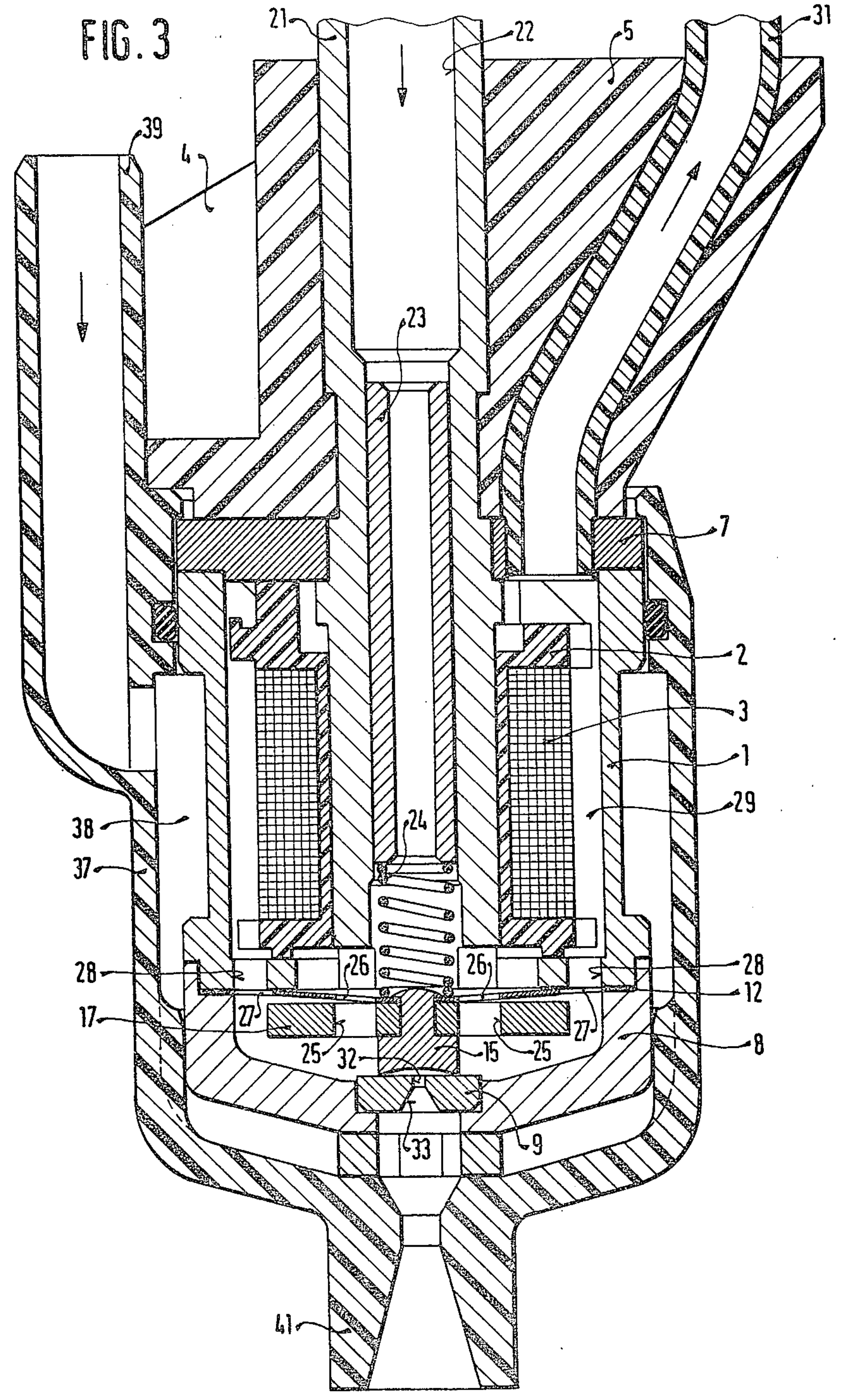
FIG. 3 shows a cross-sectional view of a third exemplary embodiment of a fuel injection valve with the provision of an air jacket surrounding the fuel stream.

In the fuel injection valve shown in FIG. 3, elements remaining the same and functioning the same as in the foregoing exemplary embodiments are again given identical reference numerals. The fuel delivery here is made via the central inlet nozzle 21, and the flushing chamber 29 is flushed by the quantity of returning fuel, as in the fuel injection valve shown in FIG. 1, while the guide diaphragm engages the side of the flat armature 17 remote from the nozzle body 9, as in the fuel injection valve shown in FIG. 2. At fuel pressures lower than 1 bar, atomization with preparation air is necessary for good preparation of the injected fuel. To this end, in the exemplary embodiment of a fuel injection valve as shown in FIG. 3, the valve housing 1 and the nozzle carrier 8 are surrounded by a jacket housing 37, made in particular of plastic, and between the jacket housing 37 and the valve housing 1 and nozzle carrier 8 an annular channel 38 is formed, which is closed off in a sealing manner from the plastic ring 5 and is supplied with air via an air line 39. The air line 39 may communicate either with a source of compressed air or with the atmosphere, for instance via an intake tube section of the internal combustion engine located upstream of a throttle valve. In the region of the annular channel 38 on the nozzle carrier 8, the air is guided transversely to the fuel stream exiting via the ejection port 33, surrounding this fuel stream, and is carried along with it in order to prepare the fuel. The fuel prepared with air can be ejected via a nozzle element 41 connected with the jacket housing 37 into the intake tube of the engine. The fuel injection valve is simultaneously thermally insulated from the outside by the plastic jacket housing 37 and the annular air channel 38.

Figure 4:
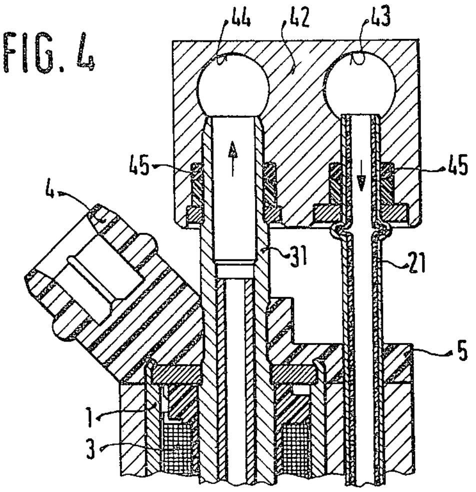
FIG. 4 shows a schamatic cross-sectional view of a multiple plug connection for one fuel injection valve.

In FIG. 4, a fuel injection valve is shown in part, which has a fuel inlet nozzle 21 and a fuel discharge nozzle 31 leading out of the fuel injection valve parallel to one another, and in which the hydraulic connections to the fuel inlet nozzle 21 and the fuel discharge nozzle 31 are made via an integrally embodied hydraulic multiple plug connection 42, through which the fuel supply line 43 and the fuel return line 44 are carried. The nozzles 21, 31 are sealed off by sealing element 45 from the hydraulic multiple plug connection 42. The individual fuel injection valves can be held by the hydraulic plug connection 42 in appropriate openings of the intake tube of the engine, not shown.

Figure 5:
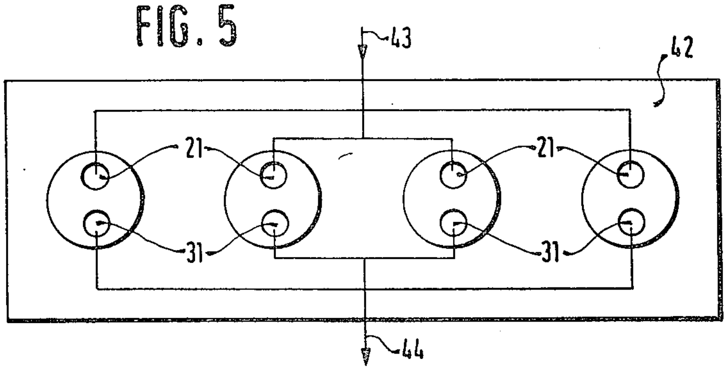
FIG. 5 shows a plan view of a series of plug connections for fuel injection valves.

FIG. 5 shows a top plan view of a multiple plug connection 42 for four fuel injection valves at once, with the hydraulic connection of the individual fuel inflow nozzles 21 and fuel outflow nozzles 31.

Figure 6:
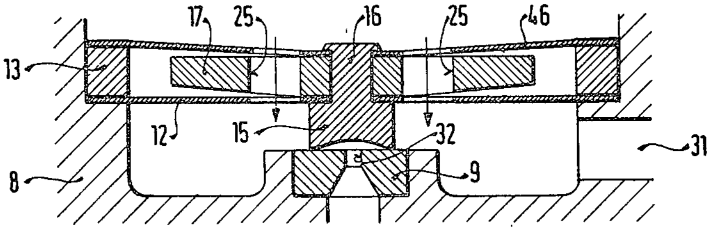
FIGS. 6, 7, 8 and 9 show various modifications for mounting of the flat armature.

In FIG. 6, a fuel injection valve is shown in a partial view. Its flat armature is connected, on its side oriented toward the valve seat 9, with a diaphragm 12 and, on its side remote from the valve seat 9, with the second guide diaphragm 46 in the middle area thereof. Both diaphragms are attached to the housing on their outer circumference and they assure the most parallel guidance possible for the flat armature 17 and the valve plate 15 relative to the valve seat 9.

Figure 7:
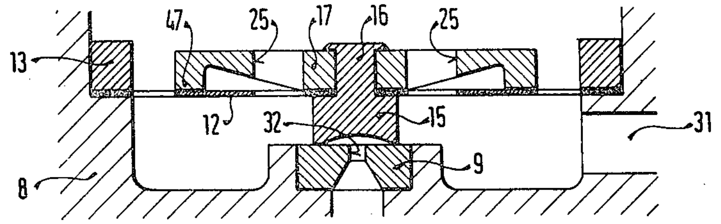

In the exemplary embodiment of a fuel injection valve shown in partial view in FIG. 7, the flat armature 17 is guided by a guide diaphragm 12 disposed on the side of the flat armature 17 oriented toward the valve seat 9 and on its circumference it has an annular protrusion 47, which is so embodied that it engages the guide diaphragm 12 only immediately before the valve plate 15 takes its seat upon the nozzle body 9, thus assuring a parallel guidance of the flat armature 17 and the valve plate 15.

Figure 8:
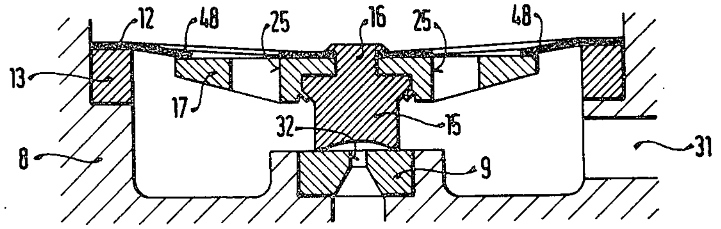

In the exemplary embodiment of a fuel injection valve shown in partial view in FIG. 8, the flat armature 17 is guided by the guide diaphragm 12 engaging the side remote from the nozzle body 9. At the same time, the side of the flat armature 17 remote from the nozzle body 9 is engaged by at least four tongues 48, embodied in the form of leaf springs and displaced relative to one another by ca. 90°. These tongues 48 guide the flat armature 17 in a parallel manner and may be cut out from the guide diaphragm 12, for instance, and bent toward the flat armature 17, or they may be held, as independent elements, between the guide diaphragm 12 and the stroke ring 13.

Figure 9:
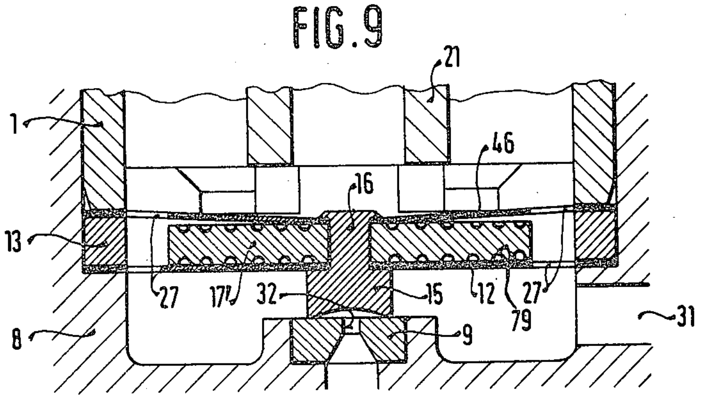

In the exemplary embodiment of a fuel injection valve shown in part in FIG. 9, the flat armature 17' guided by the guide diaphragms 12 and 46 is embodied in massive fashion and the surfaces of the flat armature 17' oriented toward the guide diaphragms 12 and 46 are made parallel, or virtually parallel, to one another. The recesses 27 in the guide diaphragms 12, 46 are located in an area which is outside the diameter of the flat armature, so that the flowing fuel flows around the outer circumference of the flat armature 17'. In this exemplary embodiment, when the valve performs an opening or closing movement, the fuel located between the guide diaphragms 12, 46 and the flat armature 17' is expressed toward the outer circumference; as a result, there is a hydraulic damping of the opening of closing movement of the valve. As a result of this hydraulic damping, inconsistencies in the characteristic curve of the injection valve, resulting from the impact of the armature 17' or the valve plate 15 as it assumes its particular terminal positions, are prevented.

In an advantageous manner, the flat armature is grooved or roughened at 79 on its sides oriented toward the guide diaphragms 12, 46, so that the smallest soil particles which may possibly reach the area between the guide diaphragms 12, 46 and the flat armature 17 can be pressed into the indentations of the grooving or roughening and will no cause undesirable tilting of the flat armature 17.

Figure 10:
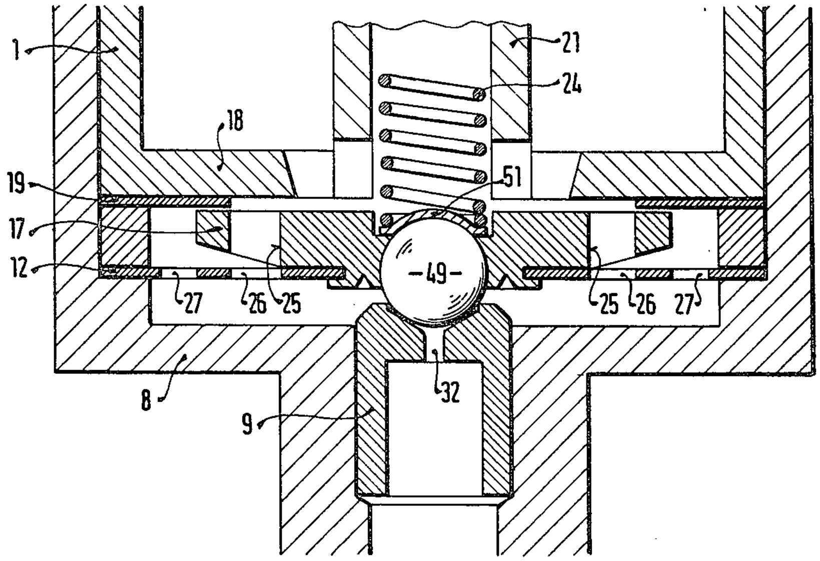
FIG. 10 shows a detailed cross-sectional view of a fourth exemplary embodiment of a fuel injection valve, seen in part.
Figure 11:
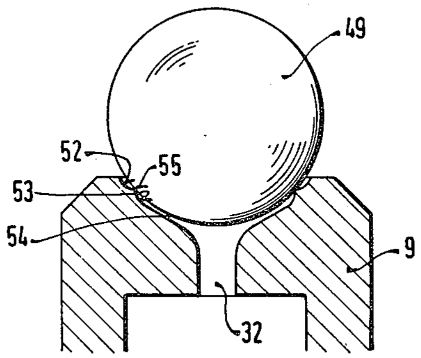
FIG. 11 shows an enlarged detailed view of a valve seat area as shown in FIG. 10.

In the fuel injection valve shown in partial view in FIG. 10, elements remaining the same or having the same function as those described in connection with the foregoing embodiments are given identical reference numerals. As shown in FIG. 10, the movable valve element may also be embodied as a ball 49, which is firmly connected with the flat armature 17, by flanging, for instance, and on the armature side remote from the nozzle body 9, the closing spring 24 engages the ball 49, via a spring plate 51, for instance. The center point of the ball 49 should be located as much as possible in one plane with the guide diaphragm 12, which prevents an unsymmetrical seating of the ball 49 in the case of a tilted flat armature 17. The valve seat surface 52 embodied within the nozzle body 9 is conical or, as shown on a larger scale in FIG. 11, is embodied in the form of a narrow spherical zone whose width is approximately 0.2 mm, and the center point of which is located above the center point of the ball 49. Downstream of the ball zone 52, an undercut 53 is provided, which is the point of departure for a flow aperture 54, which forms a dead space which is as small as possible and is embodied in as streamlined a fashion as possible, leading to the nozzle bore 32. When the valve is closed, the ball 49 is thus seated on an annular rim 55 representing the minimum diameter of the ball zone 52.

Figure 12:
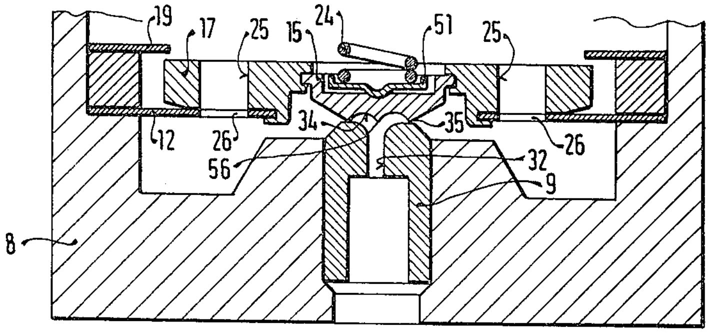
FIG. 12 shows a detailed cross-sectional view of a fifth exemplary embodiment of a fuel injection valve.

The fuel injection valve shown in partial view in FIG. 12 has a guide diaphragm 12 disposed on the side of the flat armature 17 oriented toward the nozzle body 9 and a valve plate 15 concentrically connected with the flat armature. In order to attain the most favorable possible closing behavior of the valve, the plane in which the guide diaphragm 12 is held in position should as much as possible be located in or near the plane of the valve seat. The streamlined recess 34 in the valve plate 15 is, in this exemplary embodiment, embodied as a coaxial annular groove with a round cross section disposed about a central tip 56 pointing toward the nozzle bore 32. It is advantageous for the engagement point of the closing spring 24 to be disposed as centrally as possible, for instance by means of a spring plate 51 provided with a spherical nose, and as close as possible to the valve seat.

In electromagnetically actuatable fuel injection valves with repeatable switching times, a predefined armature stroke must be generated. In known fuel injection valves, accordingly, in order to establish the armature stroke, first a comparison ring of known thickness is inserted and by means of measuring the armature stroke thus resulting, the thickness of the stroke ring finally to be inserted is ascertained. The comparison ring is then exchanged for the final ring and the fuel injection valve is assembled in finished form. A manual process of this kind not only requires a great deal of time, but it also involves many possibilities for error. New methods are described in connection with FIGS. 13, 14 and 15, which enable an automation of the establishment of the armature stroke in fuel injection valves, and in particular in the fuel injection valves described above.

Figure 13:
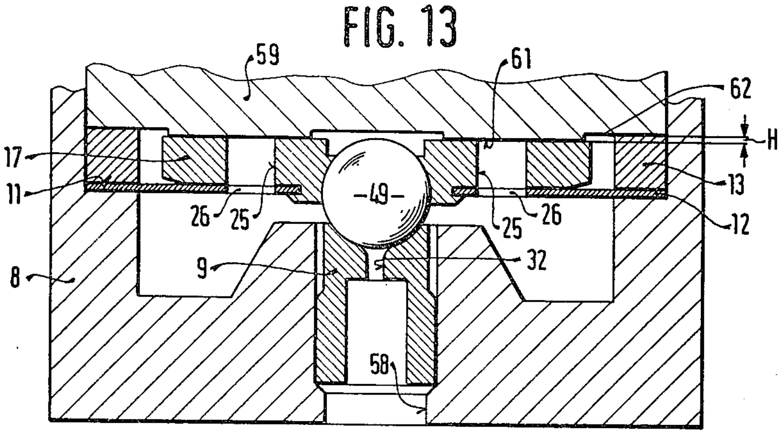
FIG. 13 shows a cross-sectional view of an apparatus for performing a method for adjusting the armature stroke of a fuel injection valve according to the invention.

In a first method for establishing the armature stroke to be described in connection with FIG. 13, the nozzle body 9, supported with a press-fit seat in bore 58 in the nozzle carrier 8, is pressed into the nozzle carrier 8, in a first work step, so far that its final axial position is not yet attained with certainty. In a second work step, the flat armature 17, provided with at least one guide diaphragm 12 and the movable valve element 15, ball 49 and the stroke ring 13 are now inserted into the nozzle carrier 8. In a third work step, a pressing tool 59 now axially engages the flat armature 17 and displaces the nozzle body 9, via the movable valve element 15, ball 49 resting on the nozzle body 9, into its final position. The pressing tool 59 is embodied such that it engages the flat armature 17 with a step 61, which protrudes outward via a shoulder 62 by the extent of the desired armature stroke H. The displacement movement of the pressing tool 59 is now performed until such time as the shoulder 62 rests firmly against the stroke ring 13, between which and the ledge 11 of the nozzle carrier 8 the guide diaphragm 12 is held.

Figure 14:
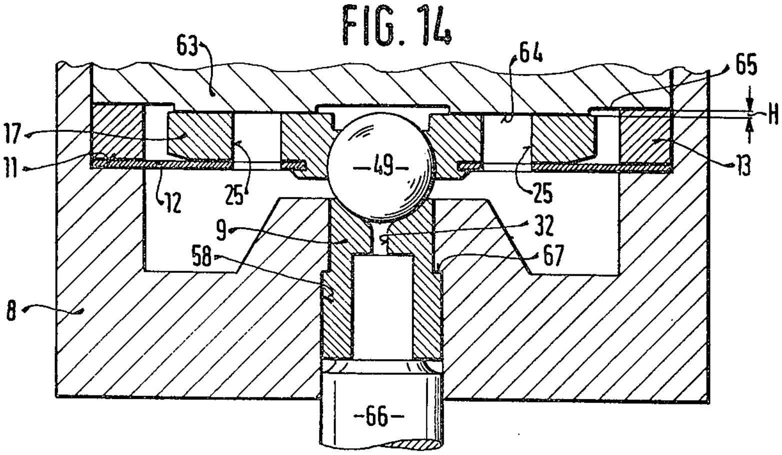
FIG. 14 shows a cross-sectional view of a second exemplary embodiment of an apparatus for performing the method for adjusting the armature stroke of a fuel injection valve according to the invention.

In the method to be described in connection with FIG. 14 for establishing the armature stroke, in a first work step the flat armature 17 provided with at least one guide diaphragm 12 and the movable valve element 15, ball 49 and the stroke ring 13 are mounted in the nozzle carrier 8, and in a second work step they are fixed in their axial position by means of a holder tool 63 which engages the flat armature 17 with a step 64. The step 64 protrudes outward relative to a shoulder 65 of the holder tool 63 by the extent of the desired armature stroke H. In a third work step, the nozzle body 9 is pressed into the bore 58 of the nozzle carrier by a pressing tool 66, which simultaneously causes flanging, until such time as the nozzle body rests with its valve seat on the movable valve element 15, ball 49. The nozzle body 9 can be provided on its circumference with a narrow shelf area 67, which represents a supplementary sealing location.

Figure 15:
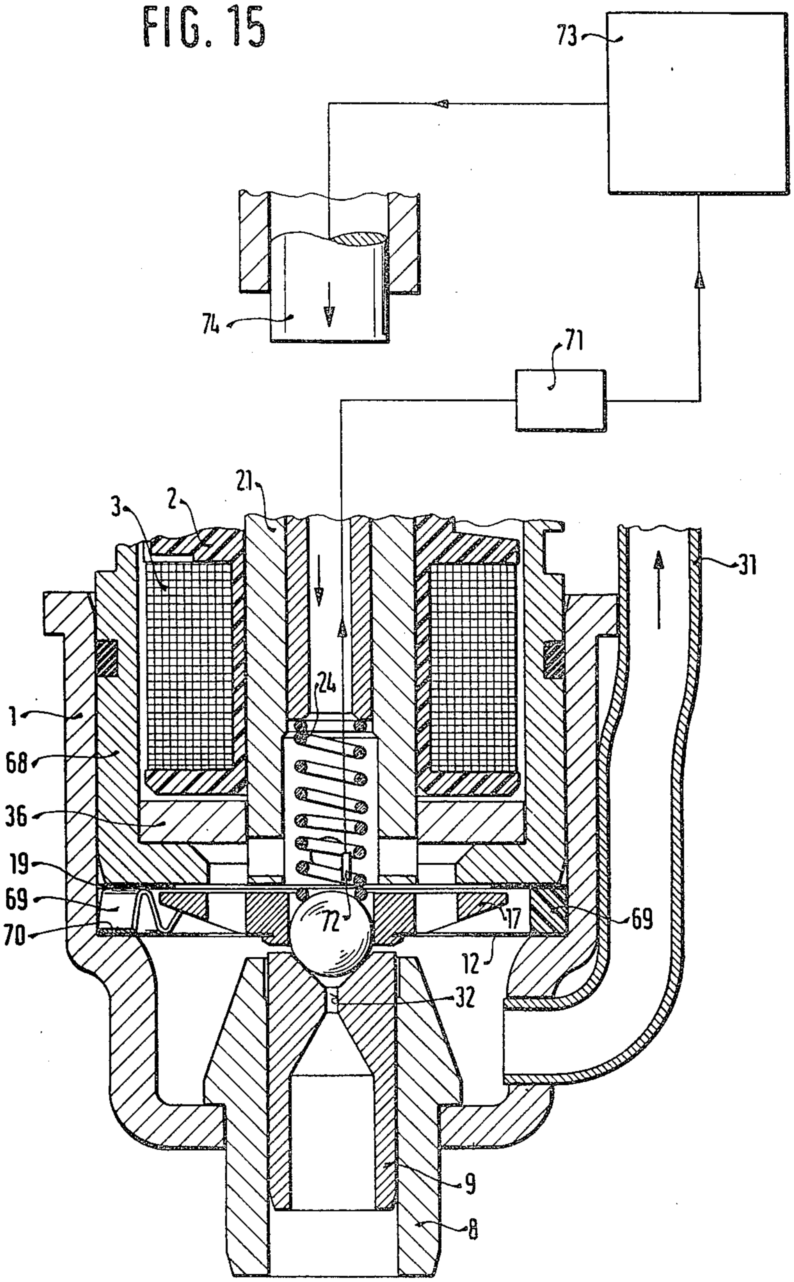
FIG. 15 shows schematically a third exemplary embodiment of an apparatus for performing a method for adjusting the armature stroke of a fuel injection valve according to the invention.
Figure 16:
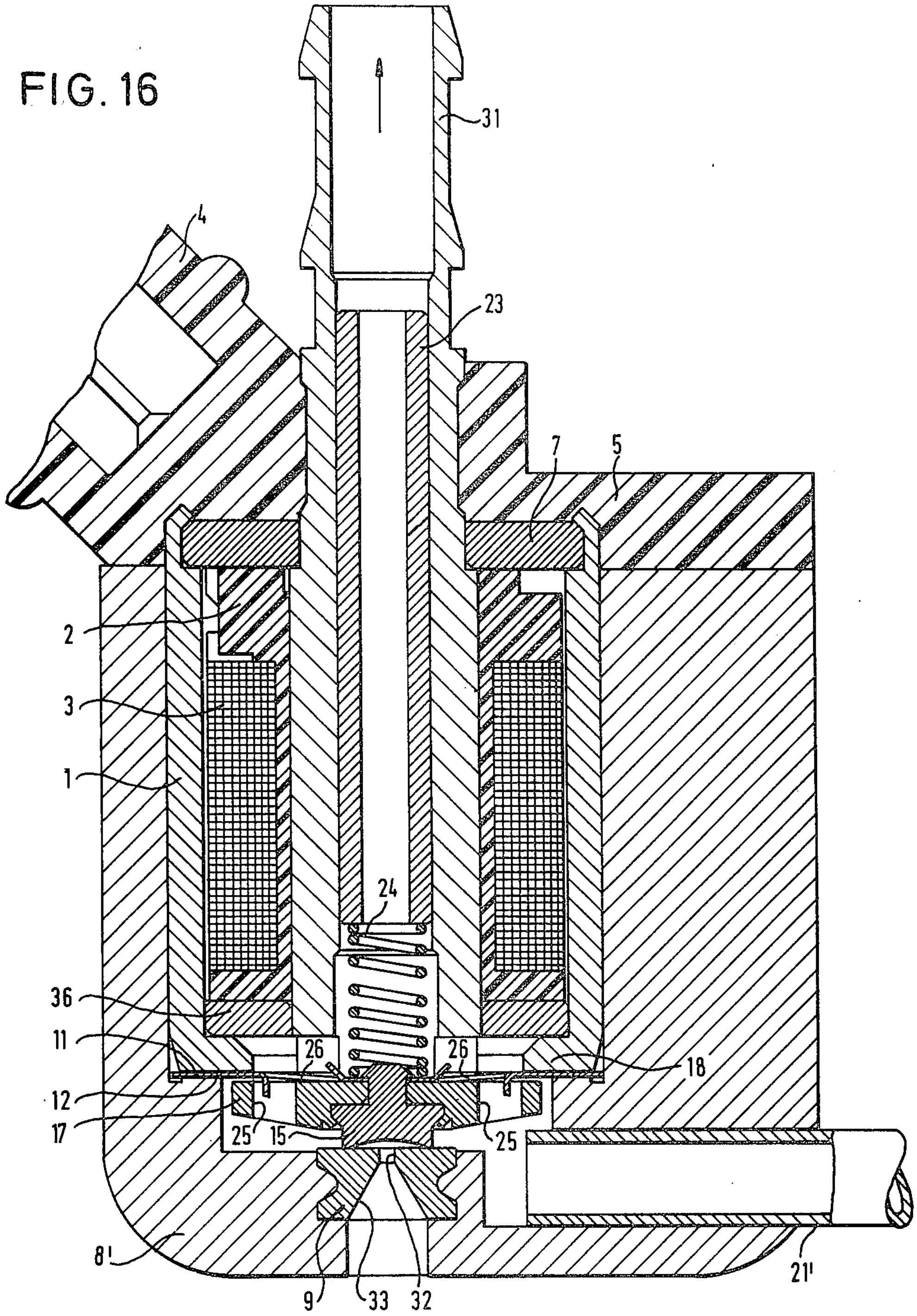
FIG. 16 shows another modification similar to that of FIG. 2.

In the method for establishing the armature stroke to be described in connection with FIG. 15, in a first work step the magnetic element 68 with the coil carrier 2, magnetic coil 3 and fuel inlet nozzle 21 is pushed so far into the valve housing 1 counter to the force of an elastically or plastically deformable ring element 69, which axially fixes the guide diaphragm 12 connected with the flat armature 17 in its outer area on a step 70, that the stroke of the flat armature 17 is still larger than the desired armature stroke H. In a second work step, the magnetic coil 3 is excited and with a suitable path-measurement system, for instance an electronic path-measurement system, the stroke of the flat armature 17 is measured via a sensor 71 and fed to an electronic control appliance (computer) 73. In a third work step, the magnetic element 68 is now displaced by a pressing tool 74 controlled by the electronic control appliance (computer) 73 to the extent of the difference from the desired armature stroke H. The elastically or plastically deformable ring element 69 may be a corrugated metal ring or a rubber elastic element.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for producing a fuel injection valve having an axially bored nozzle carrier, a nozzle positioned therein, a flat armature, a valve element positioned between said armature and said nozzle, and further provided with an annular inwardly extending shelf area comprising the steps of
   - assembling said flat armature provided with at least one diaphragm means and a stroke limiting ring into said nozzle carrier, said stroke limiting ring arranged to rest on said annular shelf area;
   - introducing a pressing tool into said nozzle carrier, said pressing tool including an armature engaging area and a stroke limiting ring engagement area;
   - forcing said pressing tool into contact with said armature and said stroke limiting ring to force said stroke limiting ring into seated engagement with said shelf area; and
   - inserting a nozzle body into said axial bore and thereafter applying pressure toward said valve element to seat said nozzle body at a desired location in said bore.

* * * * *